United States Patent [19]

Saville et al.

[11] Patent Number: 5,443,629
[45] Date of Patent: Aug. 22, 1995

[54] LATENT IMAGE INK

[75] Inventors: Jacqueline M. Saville; William G. A. Ferguson, both of Dryden, Canada

[73] Assignee: Alex Wilson Coldstream, Ltd., Dryden, Canada

[21] Appl. No.: 244,479

[22] PCT Filed: Nov. 26, 1992

[86] PCT No.: PCT/CA92/00511
§ 371 Date: May 27, 1994
§ 102(e) Date: May 27, 1994

[87] PCT Pub. No.: WO93/11198
PCT Pub. Date: Jun. 10, 1993

[30] Foreign Application Priority Data

Nov. 27, 1991 [CA] Canada .................. 2056283

[51] Int. Cl.⁶ .............................. C09D 11/10
[52] U.S. Cl. ................. 106/21 A; 106/21 R
[58] Field of Search .................. 106/21 R, 21 A

[56] References Cited

U.S. PATENT DOCUMENTS

| | | | |
|---|---|---|---|
| 241,682 | 5/1881 | Mallory | 106/25 A |
| 322,131 | 7/1885 | Schreiber | 427/7 |
| 444,180 | 1/1891 | Metchell et al. | 106/20 R |
| 901,723 | 10/1908 | Morse | 428/199 |
| 1,384,663 | 7/1921 | Imhof | 427/145 |
| 1,423,246 | 7/1922 | Morse | 106/21 R |
| 2,067,988 | 1/1937 | Smith | 427/7 |
| 3,558,341 | 1/1971 | Phillips, Jr. | 503/211 |
| 3,632,377 | 1/1972 | Williams | 427/150 |
| 3,723,156 | 3/1973 | Brockett et al. | 503/212 |
| 3,732,120 | 5/1973 | Brockett et al. | 503/210 |
| 3,732,141 | 5/1973 | Brockett et al. | 503/209 |
| 3,788,863 | 1/1974 | Scheuer | 106/21 C |
| 3,824,101 | 7/1974 | Nihyakumen et al. | 430/142 |
| 3,826,499 | 7/1974 | Lenkoff | 273/139 |
| 3,850,649 | 11/1974 | Buerkley et al. | 106/21 R |
| 3,877,372 | 4/1975 | Leeds | 101/465 |
| 3,906,141 | 9/1975 | Anderson et al. | 428/411 |
| 3,926,645 | 12/1975 | Strahl | 106/21 C |
| 3,974,769 | 8/1976 | Hochberg et al. | 101/426 |
| 4,007,046 | 2/1977 | Ort | 101/465 |
| 4,007,126 | 2/1977 | Wheatland | 252/182 |
| 4,029,012 | 6/1977 | Smith, III et al. | 101/368 |
| 4,043,811 | 8/1977 | Pratt | 430/49 |
| 4,043,820 | 8/1977 | Landau | 106/21 A |
| 4,058,470 | 11/1977 | Moschovis et al. | 252/62.1 |
| 4,097,637 | 6/1978 | Loria et al. | 428/212 |
| 4,111,702 | 9/1978 | Fraik | 106/21 C |
| 4,212,393 | 7/1980 | Lenkoff | 206/575 |
| 4,304,183 | 12/1981 | Loria et al. | 101/472 |
| 4,322,466 | 3/1982 | Tomlinson | 106/21 R |
| 4,380,196 | 4/1983 | Kato et al. | 101/453 |
| 4,505,944 | 3/1985 | Turner | 427/8 |
| 4,525,214 | 6/1985 | Panken | 106/19 B |
| 4,889,559 | 12/1989 | Goldberg et al. | 106/21 R |
| 5,017,226 | 5/1991 | Kulisz | 106/21 C |

FOREIGN PATENT DOCUMENTS

| | | |
|---|---|---|
| 1072756 | 3/1978 | Canada . |
| 1072833 | 3/1980 | Canada . |
| 1148782 | 6/1983 | Canada . |
| 261780 | 3/1988 | European Pat. Off. . |

*Primary Examiner*—Helene Klemanski
*Attorney, Agent, or Firm*—Woodcock Washburn Kurtz Mackiewicz & Norris

[57] ABSTRACT

A latent image ink particularly for use in printing forms such as games or coloring books. An offset lithographic press is used for imprinting a substantially invisible image on a sheet of standard paper. The latent ink used to form the latent image is a mixture of potassium ferrocyanide or other suitable color foxing iron complexing compounds, white ink and varnish. A developing solution such as ferric chloride or ammonium sulfate is subsequently added to the paper to render the image visible.

7 Claims, 2 Drawing Sheets

LATENT IMAGE INK

This invention relates to printing inks, and more particularly to latent image inks used in producing games, coloring books, forms, and the like. Typically, such games and books include both visible and "invisible" images; the "development" of the latent image is at least in part an object of the It is desirable to use conventional lithographic printing methods including oleoresinous inks, "wet" offset presses and standard grade offset paper in order to be able to manufacture games and the like at reasonable cost. Reusable games have been suggested. Manufacture of such games, however, could require more complex printing, developing and erasure techniques. Further, this might not be entirely cost effective, particularly if the game is usually discarded after use, for example during travel. Currently available children's game books (e.g. as disclosed in Lee, U.S. Pat. No. 3,826,449 and Lenkoff, U.S. Pat. No. 3,850,649) utilize a water-based printing ink for the printing of the latent image portions. Printing of each of the latent and visible images requires the use of different print methods. The games are printed in two passes on two different machines. Use of oleoresinous offset inks to print the latent image would be advantageous, in that both the latent and the visible images could be printed in one pass using a conventional two color (or four color) "wet" offset press.

Problems that may be encountered in the development of printed latent images include premature detection of the latent images ("clueing"), that is, when a distinction between background and latent print areas can be seen with the naked eye because of yellowing or different light reflectance of the ink and paper. Inadvertent development of latent ink images may also be caused by impurities in the ink by substances in the paper, by contamination during the printing process, or by heating of the printed latent image during print drying.

A further potential problem is that of long development time for converting the colorless image to a colored reaction product which is clearly visible. Development should preferably be relatively fast.

Other problems not encountered in letter press printing must be overcome to provide a latent image ink suitable for high speed "wet" offset printing techniques.

Canadian Patent No. 974,004 discusses the problems to be overcome in using offset presses without extensive modification. The ink vehicle and the color-forming reactant preferably should be specifically adapted to conventional lithographic offset techniques. Undesirable chemical side reactions caused by conventional metal salt "driers" should preferably be avoided. Some phenolic color-forming reactants tend to inhibit oxidation and/or polymerization of conventional offset vehicles. Finally, invisible ink penetration and migration within the paper should preferably be prevented without resorting to resin coated low porosity or other high reflectance sheets which could cause clueing. The proposed solution in that patent was the use of an ink composition in which the primary components, including the color forming reactant, had little or no solubility in water and were resistant to emulsification in water.

Canadian Patent No. 974,004 proposed the use of relatively large quantities of organic, water insoluble, hydrophobic compounds as the color forming reactant in the latent image ink, combined with conventional lithographic ink components.

Canadian Patent No. 1,148,782 deals with latent image inks suitable for dry offset printing only, i.e. inks that are water soluble and are not suited to "wet" offset printing.

It would therefore be advantageous to have a lithographic ink that permits the use of highly desirable conventional lithographic printing methods to print both the visible and invisible entries on a suitable offset grade paper. Thus, standard "wet" offset lithographic press equipment could be used, avoiding the necessity of printing the visible and latent (i.e. "invisible") images in separate operations. If latent images which are to consist of more than one color when developed (e.g. blue, red, yellow) are desired, a four color press could be used.

OBJECT OF THE PRESENT INVENTION

This invention seeks to provide a latent image ink capable of being used in conventional, high speed "wet" offset printing methods to print both latent and visible images in one pass. This invention also seeks to provide a latent image ink that can be printed on standard grade offset paper. It also seeks to provide an ink which will minimize "clueing" on the printed sheet and which will not develop prematurely or inadvertently due to heating in the drying process or impurities in the ink or paper. It also seeks to utilize standard, readily available offset ink components and additives and to utilize relatively small quantities of readily available color forming compounds in the latent image ink of minimal or no toxicity. It also seeks to utilize readily available water soluble compounds in the developing solution to react with the color forming compounds in the latent image ink to form colored visible images. It seeks to provide an ink which will "develop" to a clearly visible image quickly on the addition of an appropriate developing agent. It also seeks to provide latent image inks which can be developed into different colors. This invention also seeks to utilize compounds in the developer that will react with different color forming compounds in printed latent images to produce multicolored images. Finally, this invention seeks to provide ink and developer such that there will be no "smearing" of the latent image ink on the sheet when contacted with developing solution.

Accordingly, the present invention provides for a latent image ink capable of being printed with conventional "wet" offset printing technology on standard grade offset paper, said latent image ink comprising an oleoresinous lithographic vehicle and a small quantity of water-soluble color forming compound capable of being converted to a visible colored compound or complex when contacted with an appropriate developing solution.

The result obtained by this invention is a printed form on offset grade paper which has printed visible entries and printed latent or invisible entries which can be developed with a device such as a felt tip marker pen for dispensing a suitable developing agent.

In an alternative embodiment, this invention seeks to provide a method of preparing a latent image ink comprising:

(i) comminuting a water soluble color forming compound, such as potassium ferrocyanide or tannic acid, to a fine particulate state;

(ii) dispersing the ground color forming compound in an oleoresinous lithographic vehicle, for example a varnish, a commercially available ink, or a combination thereof; and (iii) modifying the latent image ink with conventional additives (petroleum distillate, driers, flatting agents, waxes) to meet the requirements of the "wet" offset printing equipment used.

This invention also involves the printing of games and the like using conventional "wet" offset lithographic press equipment, and standard grade offset paper, with latent image ink to provide latent images and conventional lithographic ink to provide visible images in a single pass through the press.

The attached drawing FIG. 1 illustrates an embodiment of a game comprising both visible and latent images.

The attached drawing FIG. 2 illustrates the game card of FIG. 1 with all latent images developed.

The attached drawing FIG. 3 illustrates an alternative embodiment of an unmarked game card.

The attached drawing FIG. 4 illustrates the game card of FIG. 3 with all latent images developed.

The ink of this invention thus comprises, essentially, a fine particulate water soluble color forming compound dispersed throughout an oleoresinous lithographic vehicle which can be modified with conventional lithographic ink additives to meet the requirements of the particular "wet" offset printing technology utilized.

It is well known that offset lithography prints finer ink film than any of the other major printing processes. As a result, it is essential that there be satisfactory pigment dispersion for both strength development in the ink and freedom from agglomerates that will be significantly larger than the thickness of film transferred. Such large particles, if present in excessive numbers, can produce various adverse effects. Similarly, it is essential that the water soluble color forming compound in this invention be ground finely enough so that the particles remain in dispersion.

Relatively small quantities of water soluble color forming compounds can be added to the oleoresinous vehicle to provide a latent image ink, thus minimizing any potential adverse effects on the ink properties, and reducing the possibility of suspension or dispersion problems. Even at these small concentrations of water soluble color forming compound, development to a visible image is satisfactory.

The quickset mechanism remains the dominant drying process in lithographic printing. Heatset inks are usually similar to quickset formulations, and the present invention is compatible with heatset drying.

Any of the well known oleoresinous quick set and heat set vehicles for "wet" offset printing are useful in this invention, if they are reasonably color-stable and do not yellow with age. Additionally, "brighteners" can be added to the formulation to minimize clueing, if it is found that the vehicle alone, when printed on the sheet, is slightly visible. For example, in this invention commercially available white printing ink can be added to a varnish vehicle to minimize the color difference between the printed latent image and the paper.

The use of metal salt "driers" (such as those containing cobalt or manganese) may not be entirely necessary in this invention. This is advantageous, since such metals could react with the color forming compounds in the ink so that proportionately more of these compounds would have to be added, and could possibly lead to premature development of the latent image. Accordingly, metal salt driers should be avoided.

It has also been found that the latent image inks in this invention can be printed on standard grade offset paper. Uncoated bond paper is preferred, as the latent image seems to be less visible on it than on other papers.

It was also found in this invention that the ink film thickness on the sheet should be very light, as heavy ink coverage tends to make the latent image visible to the naked eye (i.e. clueing occurs) and appears to result in smearing of the image when contacted with developing solutions.

With this invention white lithographic ink can be printed in the same pass as a colored lithographic ink and a latent image ink. The white ink can be printed adjacent to and surrounding the printed latent images to "hide" the latent image and further reduce the possibility of "clueing".

In addition, it is well known in the art that an essential characteristic of "wet" offset printing ink is that it be hydrophobic and that preferably each of the primary components in the ink have little or no solubility in water and be resistant to emulsification by water. It is usually considered essential that the pigments used in the ink must be fundamentally insoluble in, and unreactive with, the aqueous or aqueous/alcohol fount solution used in the printing process. It has been noted that use of even very water soluble color forming compounds is not problematic in this invention.

It is well known in the art that there are a variety of compounds which can react with other compounds by one means or another to form a strongly colored compound or complex, e.g.

indicators which change color or become colored when exposed to acid or alkaline conditions "redox" indicators compounds which react with metal ions In the development of this particular invention, water soluble color forming compounds from the latter group were tested. Quantities of tannic acid or potassium ferrocyanide, which react with ferric ($Fe^{+++}$) ions to form colored compounds, were ground to a suitably small size, dispersed in a "wet" offset oleoresinous vehicle, and printed on standard grade offset paper. The printed latent image was then developed with an aqueous solution of either ferric chloride or ferric ammonium sulfate.

It was found that when a lithographic varnish alone was used as a vehicle, "clueing" was a problem, because of the color difference between the white sheet and the printed latent image ink. This problem was minimized by adding quantities of white ink to the latent image ink. Similarly, if colored paper was used, a suitable colored ink should form part of the vehicle.

An example of a latent image ink developed and tested which showed minimal "clueing" on the printed sheet and developed to a visible blue color when contacted with ferric ions in solution is as follows:

| Component | wt % |
| --- | --- |
| Potassium Ferrocyanide | 0.44 |
| Varnish | 24.67 |
| White Ink | 74.89 |
| | 100.00 |

In full scale printing, such an ink can be suitably modified with conventional additives (for example petroleum distillate, driers, waxes, anti set-off compounds, and modifiers) to adjust the ink characteristics (viscosity, tack, etc.) to meet the requirements of the particular "wet" offset printing equipment used.

The color forming compounds tested here developed to a blue color with ferric ions in the developing solution. It is well known that other color forming compounds are available which, when they react with or complex ferric ions, form other colors (for example, glyoximes). In addition, a number of compounds are available which react with or complex ferrous ions and which can be added to an oleoresinous vehicle to form latent image inks (for example, 1,10-phenanthroline or 2,2-bipyridine). Formulation of different latent image inks containing such compounds is possible, and the latent images can be printed with these inks in a single pass on a multicolor lithographic press would. When contacted with a "common" developing solution, containing $Fe^{+++}$ ions or both $Fe^{++}$ and $Fe^{+++}$ ions, multicolored visible images are formed.

Similarly, pH indicator and redox indicators are available which can be added to a "wet" offset oleoresinous vehicle to serve as color forming compounds rather than metal complexing/reactant compounds. These chemicals, form visible, highly colored compounds when contacted with "common" acid/alkali or reducing/oxidizing developing solutions respectively.

It was found that "smearing" of the printed latent image when contacted with developing solution can be avoided by printing a thin ink film on the sheet. It was also found that adding quantities of an organic solvent such as no. 2-butoxyethanol to the aqueous developing solution reduced smearing. It was also found that the developing solution should preferably be delivered using a light pressure with a "soft-tip" felt marker. It has been found that the pressman in the print shop can inspect the latent image on the printed sheet by using a fluorographic lamp.

DESCRIPTION OF THE DRAWINGS

A game card (marking sheet) shown generally at 10 in FIG. 1 is a form printed with visible indicia 12 using the ink described above in a "wet" offset printing step. The visible indicia define a playing area. Printed instructions or character depictions may also be included. The latent images 18 appear as illustrated in FIG. 2 when a felt tip marker (not shown) of conventional design is used to apply the developing solution described above to the preprinted game card 10. It has been found that only very light pressure is required to obtain an image. The latent images 18 such as symbols or directions, revealed in turn, determine the progress of the game.

In an alternative embodiment a game card (marking sheet) shown generally at 20 in FIG. 3 is printed with visible indicia 22 defining a playing area. Printed instructions or character depictions may also be included. The latent images 28 appear as illustrated in FIG. 4 when a felt tip marker (not shown) of conventional design is used to apply the developing solution described above to the preprinted game card. The latent images 28 such as symbols or directions, revealed in turn, determine the progress of the game.

Figure 1:
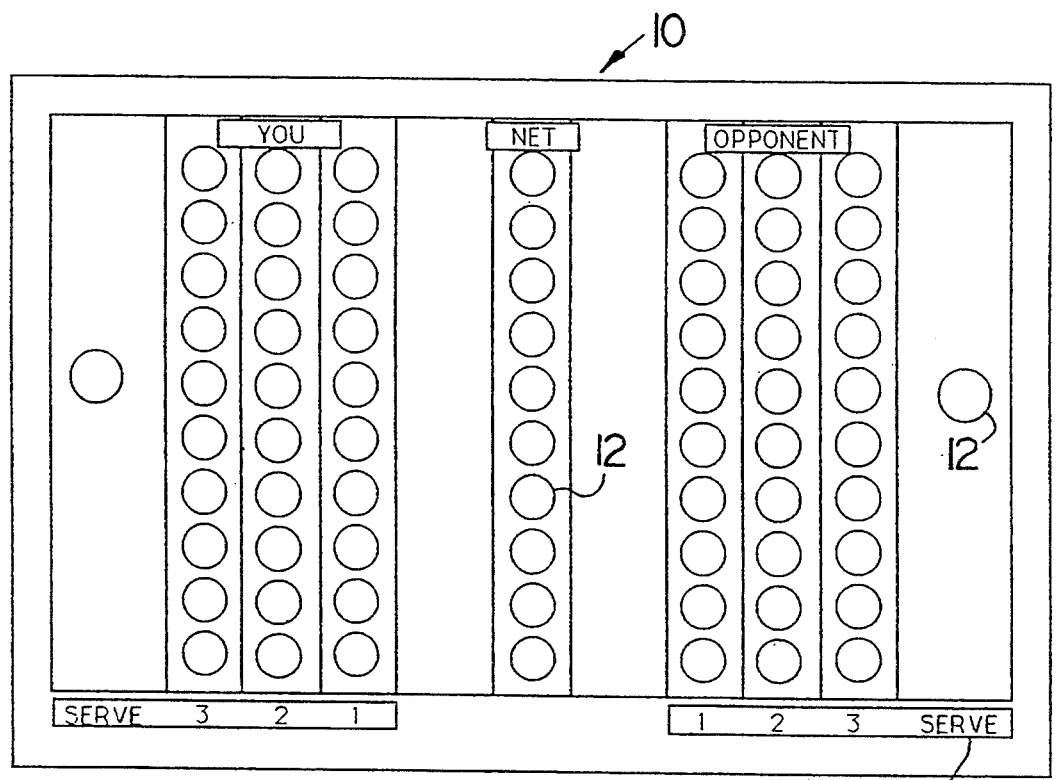
Figure 2:
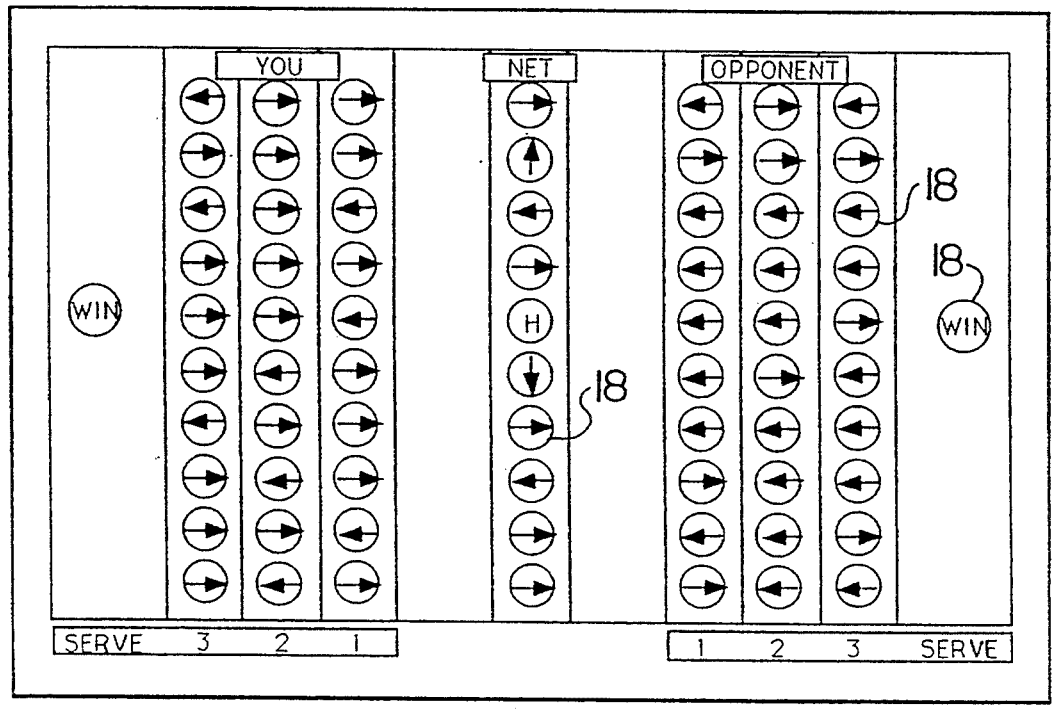
Figure 3:
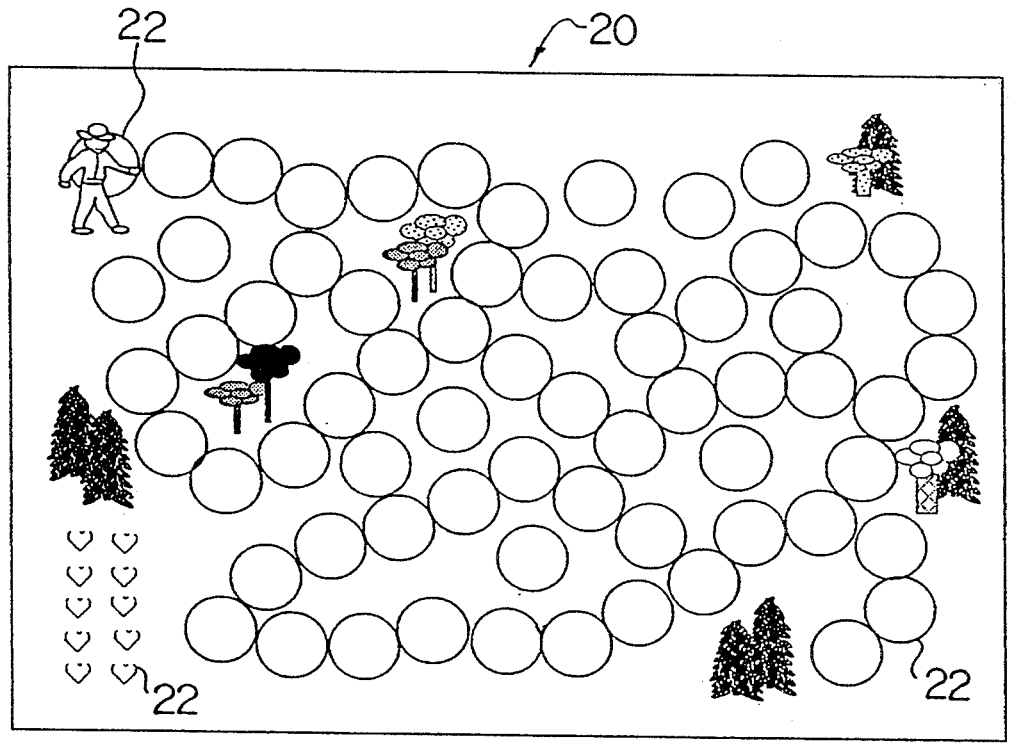
Figure 4:
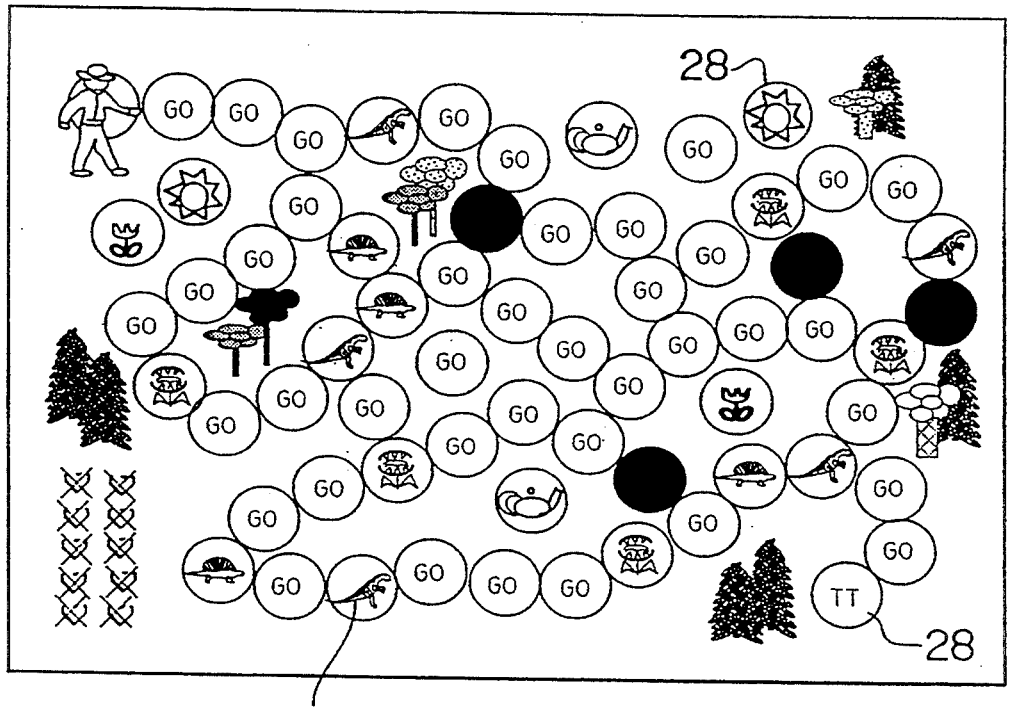

What is claimed is:

1. A latent image ink capable of being printed with conventional lithographic "wet" offset printing technology comprising:
an oleoresinous vehicle suitable for lithographic "wet" offset printing containing an amount, effective to provide a latent image of a colorless or light-colored, water soluble, particulate color forming inorganic compound capable of forming a strongly colored complex or compound when reacted with an appropriate agent dispersed throughout the vehicle, wherein the inorganic compound is potassium ferrocyanide.

2. A printed form comprising:
a standard grade offset paper carrying at least two images, one of which is a plurality of printed visible entries, printed with a conventional lithographic "wet" offset ink;
and the other of which is a plurality of printed "invisible" entries comprising latent images printed with a latent image ink comprising an oleoresinous lithographic vehicle, particulate potassium ferrocyanide dispersed in the vehicle, and conventional lithographic ink additives.

3. A kit comprising the printed form of claim 2 and a means of applying a developing agent comprising an inorganic ferric salt in a aqueous solution and optionally containing an evaporation inhibitor.

4. The kit of claim 3 where the means of applying said developing agent is a felt tip marking instrument.

5. A printed form comprising:
a standard grade offset paper carrying at least two images, one of which is a plurality of printed visible entries, printed on the form with a conventional lithographic "wet" offset ink;
and the others of which comprising a plurality of printed invisible entries comprising latent images, said invisible entries comprising a plurality of individual deposits of at least two different latent image inks in adjacent and/or intermingling relationship, said plurality of individual deposits being optically unresolvable, each of said latent image inks comprising an oleoresinous lithographic vehicle, a particulate, water soluble, colorless or lightly colored color forming compound, and conventional lithographic additives, each of the said latent image inks containing a different color forming compound, wherein the color forming compound is potassium ferrocyanide.

6. A kit comprising the printed form of claim 5 and a means of applying a developing agent comprising an inorganic ferric salt in an aqueous solution and optionally containing an evaporation inhibitor.

7. The kit of claim 6 where the means of applying said developing agent is a felt tip marking instrument.

* * * * *